United States Patent
Vazquez Baca et al.

(10) Patent No.: US 10,753,382 B2
(45) Date of Patent: Aug. 25, 2020

(54) TOLERANCE COMPENSATOR CLIP TO REDUCE ASSEMBLY VARIATION

(71) Applicant: Ford Global Technologies, LLC, Dearborn, MI (US)

(72) Inventors: Ana Valeria Vazquez Baca, Mexico City (MX); Jose Israel Castro, Naucalpan (MX); Paulina Vazquez Orpinel, Mexico City (MX); Mario Oscar Martinez Ordaz, Mexico City (MX); Martha Patricia Adame Contreras, Calimaya (MX); Ricardo Enrique Navarro Ascencio, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 197 days.

(21) Appl. No.: 15/797,317

(22) Filed: Oct. 30, 2017

(65) Prior Publication Data

US 2019/0128304 A1    May 2, 2019

(51) Int. Cl.
| | |
|---|---|
| *F16B 5/06* | (2006.01) |
| *B60R 13/02* | (2006.01) |
| *B60R 13/04* | (2006.01) |
| *F16B 19/00* | (2006.01) |
| *A01K 1/03* | (2006.01) |

(52) U.S. Cl.
CPC .............. *F16B 19/00* (2013.01); *A01K 1/033* (2013.01); *B60R 13/0206* (2013.01); *B60R 13/02* (2013.01); *B60R 13/04* (2013.01)

(58) Field of Classification Search
CPC ..... F16B 5/0657; F16B 5/0664; B60J 5/0468; B60J 5/0469; B60R 13/0206; B60R 13/0212; B60R 13/0243
See application file for complete search history.

(56) References Cited

U.S. PATENT DOCUMENTS

| | | | |
|---|---|---|---|
| 4,176,428 A * | 12/1979 | Kimura | B60R 13/0206 24/297 |
| 6,264,393 B1 | 7/2001 | Kraus | |
| 6,431,585 B1 * | 8/2002 | Rickabus | B60R 21/215 24/114.05 |
| 7,178,855 B2 | 2/2007 | Catron et al. | |
| 8,677,573 B2 | 3/2014 | Lee | |
| 8,776,326 B2 | 7/2014 | Clarke et al. | |

* cited by examiner

*Primary Examiner* — Jack W Lavinder
(74) *Attorney, Agent, or Firm* — Burris Law, PLLC

(57) ABSTRACT

A connection assembly is provided that includes a pin and a clip. The pin includes a head portion having two spaced flanges defining a slot therebetween, a tail portion defining a bulb, and a shaft extending between the head and tail portion. The clip includes a plurality of resilient fingers extending radially inward and a central cavity. The pin extends through the central cavity of the clip and the resilient fingers receives and rotationally engages with the bulb of the pin. In one form, the connection assembly connects a molded doghouse to an adjacent part.

20 Claims, 6 Drawing Sheets

TOLERANCE COMPENSATOR CLIP TO REDUCE ASSEMBLY VARIATION

FIELD

The present disclosure relates to mechanical connectors, and more particularly to connectors for joining adjacent parts such as motor vehicle body parts including exterior body panels and decklids.

BACKGROUND

The statements in this section merely provide background information related to the present disclosure and may not constitute prior art.

In the manufacturing industry, fit and finish inspections occur prior to turnover to determine if the product, such as for example, a vehicle meets industry standards and is aesthetically appealing. Common areas of inspection in the automotive industry include inspection of the interior and exterior trim, joining of components, paint variations, how tight doors open/close, among others. A positive fit and finish inspection reduces correction of defective, failed or non-conforming products, therefore, reducing the amount of scrap along with costs associated with correcting non-conforming products.

When joining components, such as connecting a molded trim panel to a support panel, supporting structures, such as doghouses, are often use because they provide for easier assembly and are cost efficient. A pin and/or striker may be used to connect the doghouse to the mating component. Doghouses are commonly used, for example, when securing door claddings to door panels, decklid applique to a decklid, and chrome spears to mating panels, among others.

Some challenges associated with doghouses include system variations, such as deviations in an X, Y, and/or Z direction, which contribute to misalignment or poor fit of the mating component. System variations that lead to negative fit and finish inspections increases the overall cost of production. These costs include correcting defects and non-conforming products, increase in scrap material, and the cost of labor, among others. These challenges in the fit and finish of products are addressed by the present disclosure.

SUMMARY

In one form of the present disclosure, a connection assembly is provided that comprises a pin and a clip. The pin includes a head portion comprising two spaced flanges defining a slot therebetween, a tail portion defining a bulb, and a shaft extending between the head portion and the tail portion. The clip comprises a plurality of resilient fingers extending radially inward and a central cavity. The pin extends through the central cavity of the clip and the shaft of the pin is disposed within the cavity of the clip. The plurality of resilient fingers receives and rotationally engage the bulb.

According to one variation, the plurality of resilient fingers defines tapered end faces adapted to conform to an outer surface of the bulb. The number of resilient fingers may vary, and in one form, the clip comprises four resilient fingers. In one form, the plurality of resilient fingers are evenly spaced.

In another variation, the clip further comprises a proximal flange spaced a distance D from the two spaced flanges of the pin, wherein the distance D is configured to limit rotation of the pin relative to the clip. Further, the outer surface of the clip is tapered inwardly in a distal direction.

The slot of the pin is sized to receive a wall of a component to be secured to an adjacent component. The bulb of the pin may take on various geometric shapes, and in one form the bulb is spherical. In one form, at least one of the pin and the clip is made of a plastic material.

In another form of the present disclosure, an assembly is provided that includes a molded doghouse defining a wall, a part disposed adjacent to the wall of the molded doghouse and a connection assembly for connecting the molded doghouse to the part. The connection assembly comprises a pin having a head portion comprising two spaced flanges defining a slot therebetween, a tail portion defining a bulb, and a shaft extending between the head portion and the tail portion, wherein the slot is adapted to receive the wall of the doghouse. In one form, the bulb is spherical. The connection assembly further comprises a clip comprising a proximal flange spaced a distance D from the two spaced flanges of the pin, wherein the distance D is configured to limit rotation of the pin relative to the clip, and the part abuts a lower surface of the proximal flange. The clip also includes a plurality of resilient fingers extending radially inward and a central cavity, wherein the pin extends through the central cavity of the clip, and the plurality of resilient fingers receive and engage the bulb.

In one variation, the plurality of resilient fingers defines tapered end faces adapted to conform to an outer surface of the bulb. At least one of the pin and the clip are plastic. An outer surface of the clip is tapered inwardly in a distal direction. In another form, a motor vehicle is provided that includes the connection assembly as set forth herein.

In yet another form of the present disclosure, a connection assembly is provided that includes a pin comprising a head portion comprising two spaced flanges defining a slot therebetween, a tail portion defining a bulb, and a shaft extending between the head portion and the tail portion. In one variation, the bulb is spherical. In this form, the connection assembly includes a clip comprising a proximal flange spaced a distance D from the two spaced flanges of the pin, wherein the distance D is configured to limit rotation of the pin relative to the clip, a plurality of resilient fingers extending radially inward, and a central cavity. The pin extends through the central cavity of the clip, and the plurality of resilient fingers receive and engage the bulb. The plurality of resilient fingers defines tapered end faces adapted to conform to an outer surface of the bulb.

DRAWINGS

In order that the disclosure may be well understood, there will now be described various forms thereof, given by way of example, reference being made to the accompanying drawings, in which.

Figure 1:
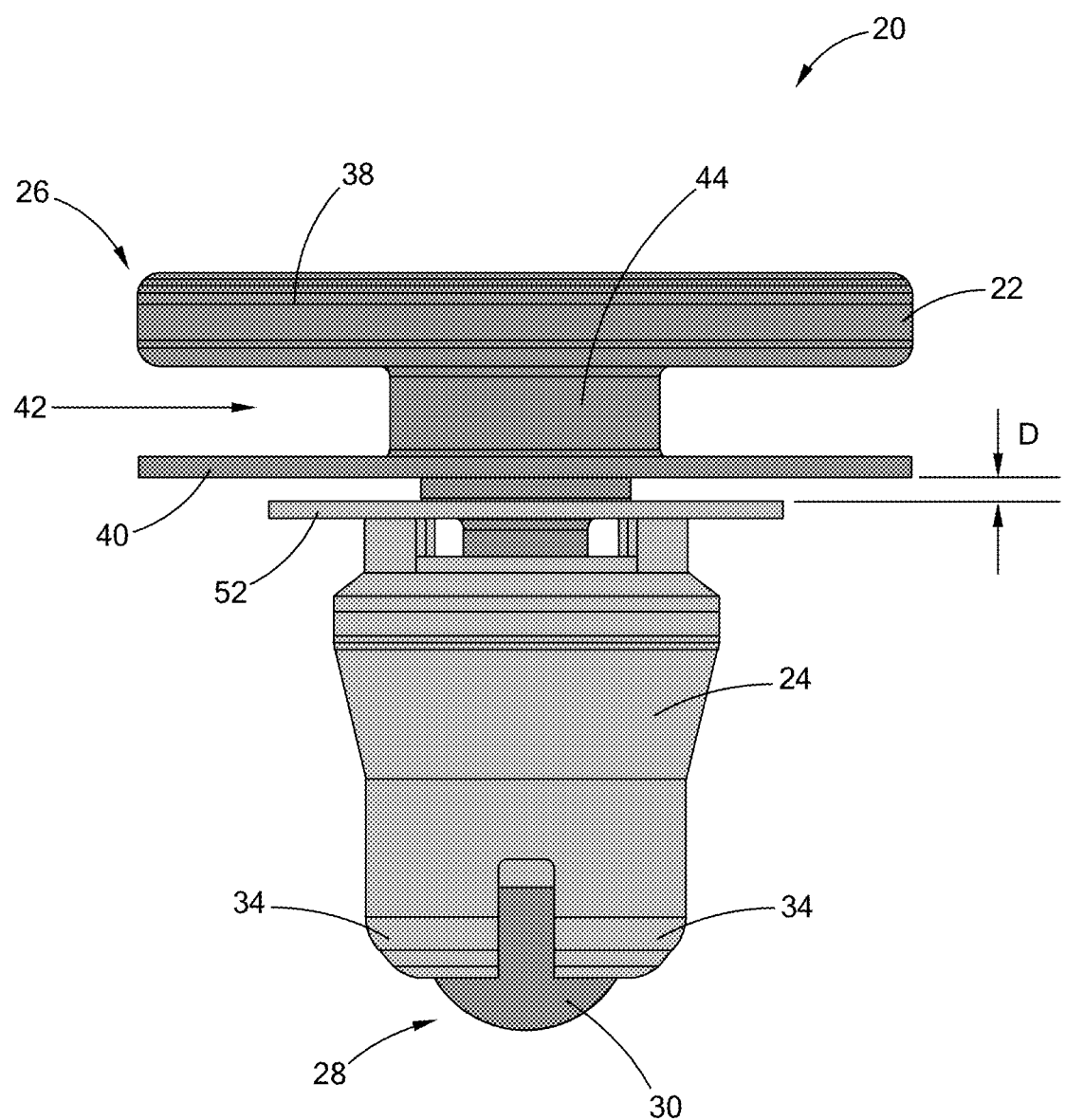
FIG. 1 is a side view of a connection assembly constructed in accordance with the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
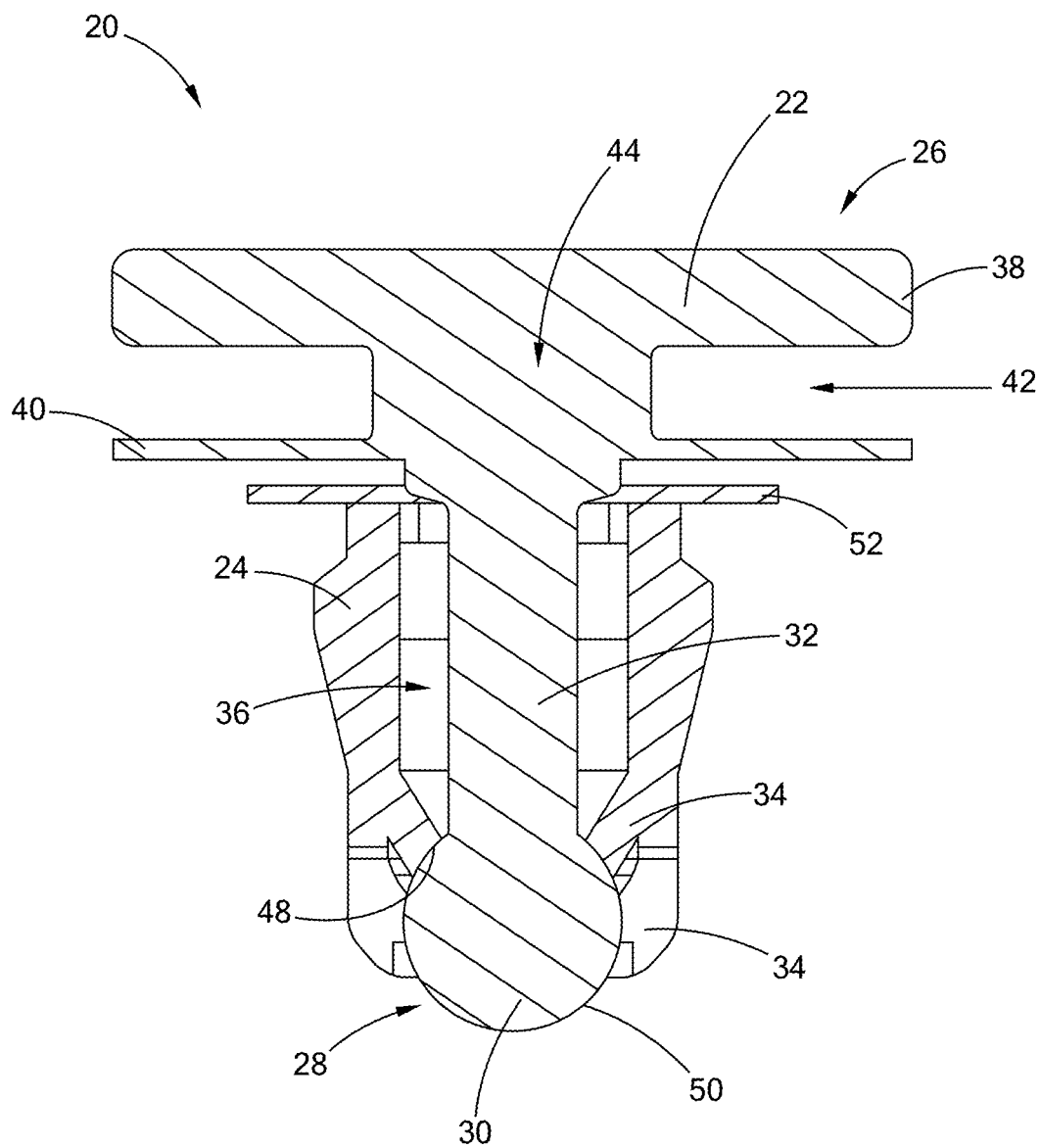
FIG. 2 is a cross-sectional side view of the connection assembly of FIG. 1, shown rotated to the left, according to the teachings of the present disclosure.

Referring to FIGS. 1-2, a connection assembly for securing adjacent components together is illustrated according to the principles of the present disclosure and generally indicated by the reference numeral 20. The connection assembly 20 generally comprises a pin 22 and a clip 24.

The pin 22 includes a head portion 26 and a tail portion 28, with the tail portion 28 defining a bulb 30 as shown. The clip 24 comprises a plurality of resilient fingers 34 and a central cavity 36, wherein the pin 22 extends through the central cavity 36 of the clip 24, and the resilient fingers 34 receive and rotationally engage the bulb 30 of the pin 22 as described in greater detail below. The bulb 30 is illustrated as having a spherical configuration, however, it should be understood that the bulb 30 may take on a number of geometries, for example a polygonal shape, among others, while still remaining within the scope of the present disclosure.

The components of the connection assembly 20 may be any of a variety of materials and in one form, at least one of the pin 22 and the clip 24 are made of plastic material. It should be understood, however, that other materials may also be employed while remaining within the scope of the present disclosure.

As further shown, the head portion 26 of the pin 22 comprises an upper flange 38 and a lower flange 40. The upper and lower flanges 38, 40 are spaced apart such that a slot 42 is defined therebetween. The slot 42 is configured to receive at least one wall of a component (e.g., doghouse) to be secured to an adjacent component (e.g., body panel) (FIG. 4B). The pin 22 further includes a central neck portion 44 that extends between the upper and lower flange 38, 40.

The clip 24 further comprises a proximal flange 52 spaced a distance D from the lower flange 40 of the pin 22. Since the pin 22 is rotatably secured within the clip 24, the distance D is configured to limit rotation of the pin 22 relative to the clip 24, which is described in greater detail below.

Figure 3:
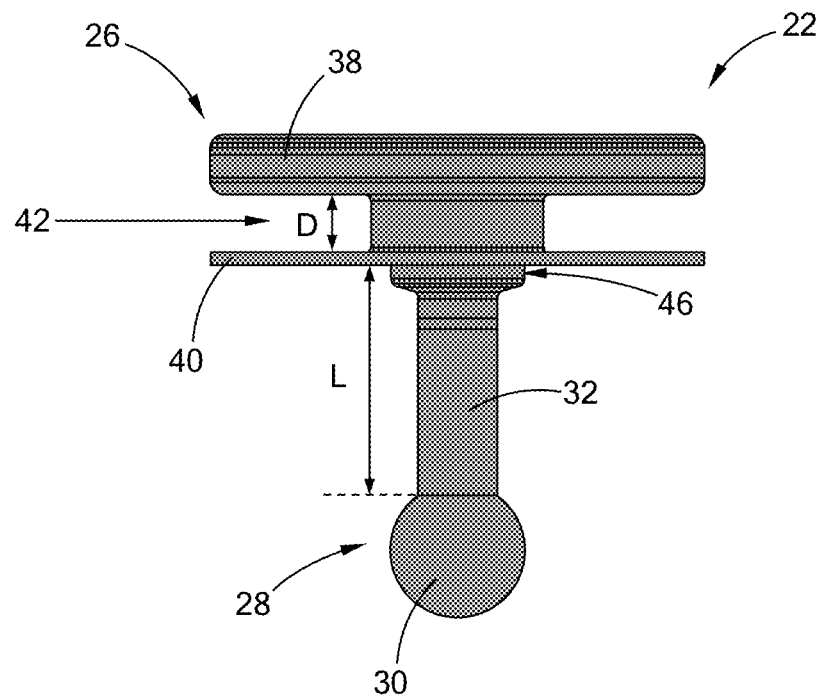
FIG. 3 is an exploded side view of the connection assembly of FIG. 1 according to the present disclosure.
Figure 3:
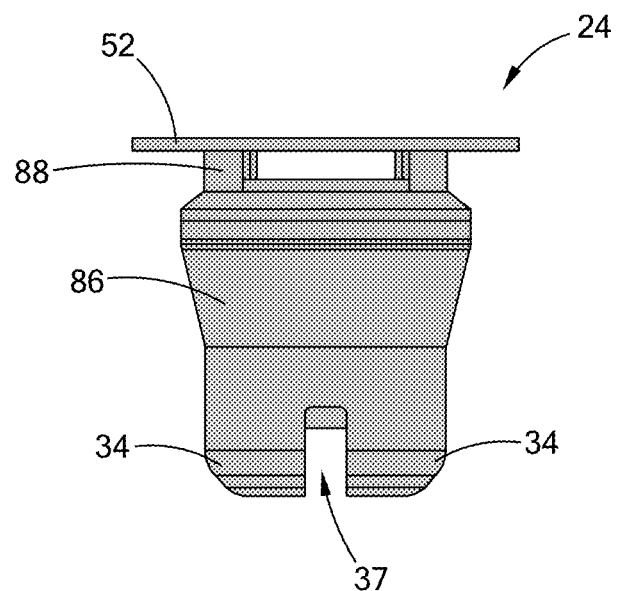

Referring now to FIG. 3, the pin 22 further comprises a shaft 32 that extends between the head portion 26 and the tail portion 28. In one form, the shaft 32 includes a proximal end portion 46 having a greater diameter than the remaining length of the shaft 32. Alternatively, the shaft 32 has a constant diameter extending the entire length L of the shaft 32. The shaft 32 has a length L sufficient for a portion of the proximal end 46 of the shaft 32 to extend beyond the proximal flange 52 of the clip 24, which is described in greater detail below.

The clip 24 also includes a plurality of cutouts 37 between the resilient fingers 34. These cutouts 37, along with the material of the clip 24/resilient fingers 34, allow the resilient fingers 34 to elastically deflect to receive the bulb 30 of the pin 22. More specifically, and referring also to FIG. 2, as the pin 22 is inserted into the cavity 36 of the clip 34, the bulb 30 engages the resilient fingers 34 and forces the resilient fingers 34 to deflect outwardly to receive the bulb 30 therebetween. When the bulb 30 is properly positioned, the outward force applied to the resilient fingers 34 by the bulb 30 is removed, and the resilient fingers 34 return to their normal/static position such that the tapered end faces 48 of the resilient fingers 34 conform to the outer surface 50 of the bulb 30. Thus, the bulb 30 is cradled and secured by the resilient fingers 34. The bulb 30 and the resilient fingers 34 further interface to inhibit axial movement of the pin 22 relative to the clip 30. However, at the same time, the engagement between the bulb 30 and the resilient fingers 34 allows the pin 22 to rotate relative to the clip 24.

In one form, the resilient fingers 34 of the clip 24 extend radially inward around a periphery of a distal end portion of the central cavity 36. In one form, the clip 24 comprises four (4) equally spaced resilient fingers 34, however, it should be understood that any number of resilient fingers 34 may be employed in accordance with the teachings of the present disclosure. Additionally, the resilient fingers 34 need not be evenly spaced as illustrated herein.

In one form, each of the resilient fingers 34 define a tapered end face 48 adapted to conform to an outer surface 50 of the bulb 30, thereby facilitating a rotational engagement of the pin 22 to the clip 24. As shown, the tail portion 28 of the pin 22 is inserted through the central cavity 36 clip 24.

Figure 4A:
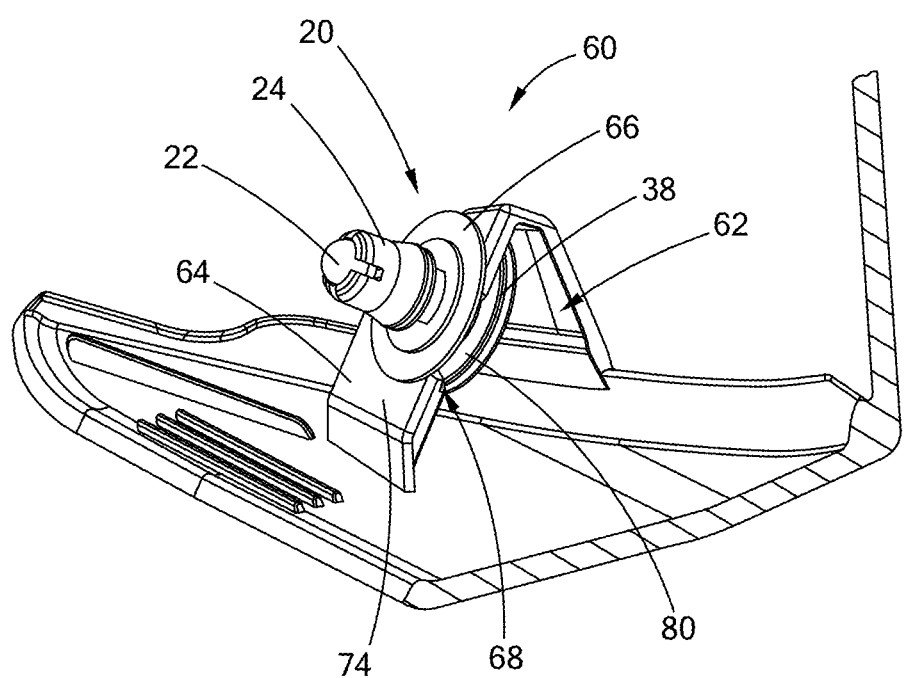
FIG. 4A is a perspective view of a connection assembly of the present disclosure installed in a doghouse.
Figure 4B:
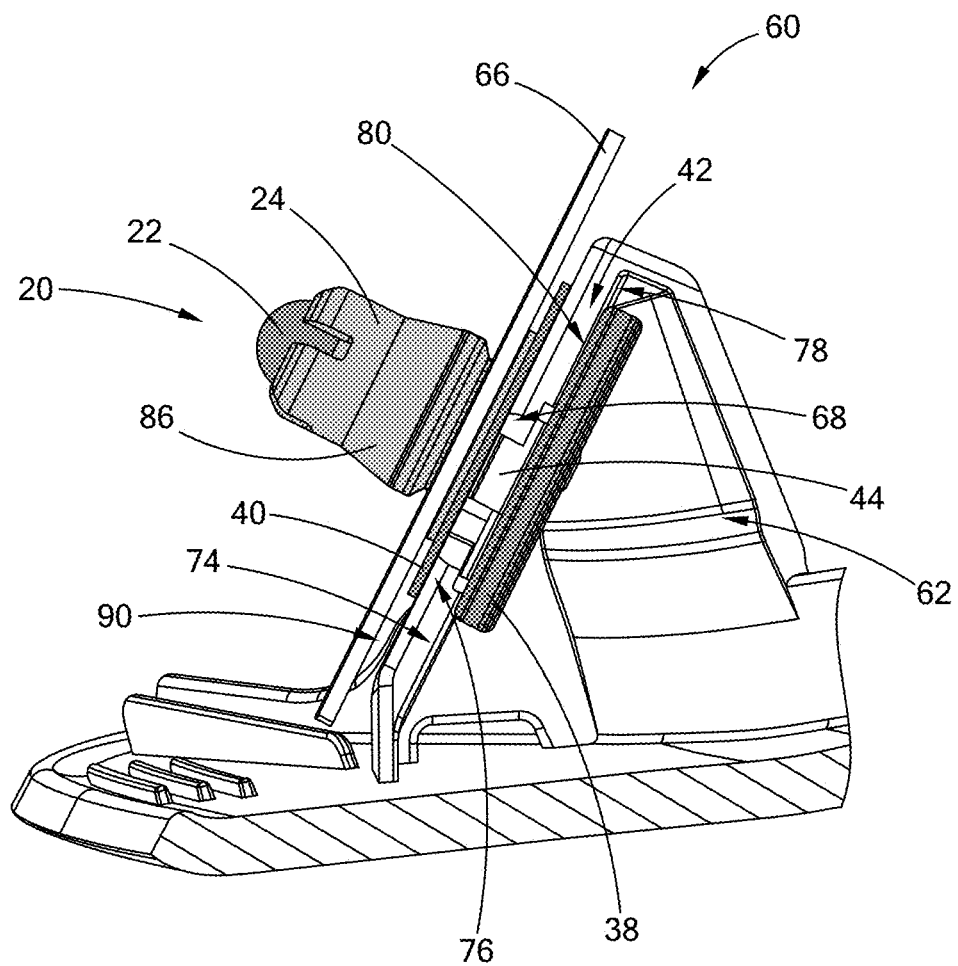
FIG. 4B is a side view of the connection assembly of FIG. 4A in accordance with the present disclosure.

Referring to FIGS. 4A and 4B, insertion of the connection assembly 20 into an assembly 60 of two adjacent mating components is illustrated. As best shown in FIG. 4B, the assembly 60 comprises a doghouse 62 defining at least one wall 64 and a part 66 (e.g., outer body panel) disposed adjacent to the wall 64. For simplicity sake, only a portion of the part 66 is illustrated. Furthermore, it should be understood that the use of a doghouse 62 is exemplary only and the connection assembly 20 may be used in a variety of applications and thus the illustration of a doghouse 62 and mating part 66 should not be construed as limiting the scope of the present disclosure.

The molded doghouse 62 defines an insertion opening 68 configured to guide and receive the entire connection assembly 20. More specifically, the slot 42 defined between the upper and lower flanges 38, 40 of the pin 22 receives the wall 64 of the molded doghouse 62. When the connection assembly 20 is properly inserted, a front face 74 of the wall 64 is in contact with an inner surface 76 of the lower flange 40, and a back face 78 of the wall 64 is in contact with an inner surface 80 of the upper flange 38, thereby securing the pin 22 to the molded doghouse 62.

Figure 5A:
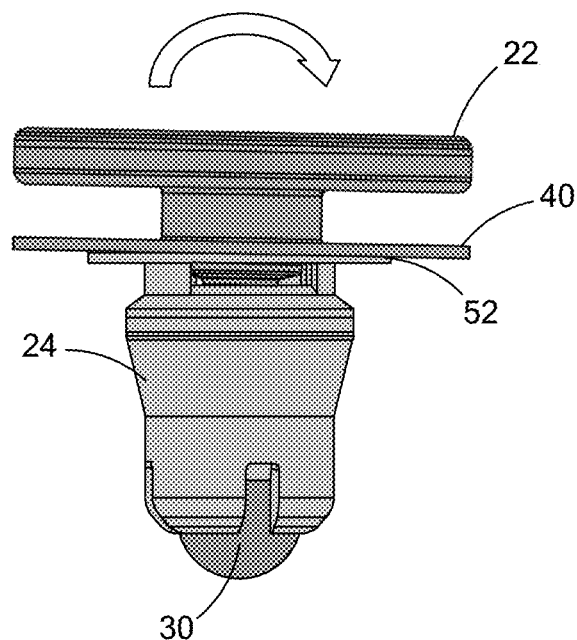
FIG. 5A is a side view of a connection assembly illustrating a pin rotating in one direction according to the teachings of the present disclosure.
Figure 5B:
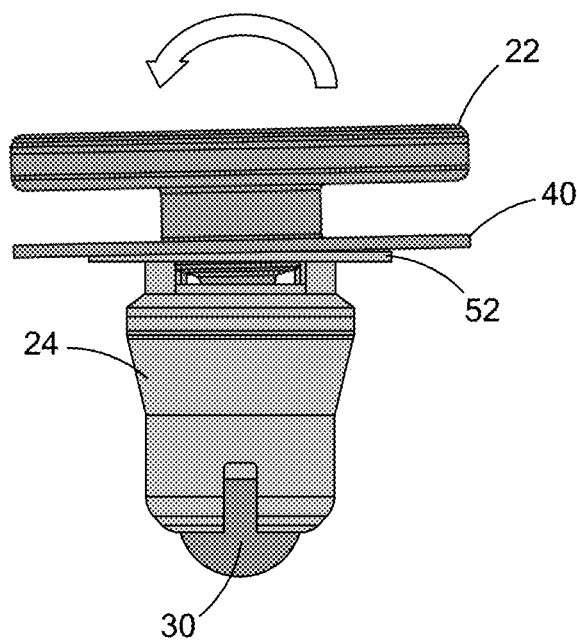
FIG. 5B is a side view of the connection assembly of FIG. 5A illustrating the pin rotating in another direction according to the present disclosure.

FIGS. 5A and 5B illustrates an example of the connection assembly 20 accommodating tolerance variations between the wall 64 of the doghouse 62 and the adjacent part 66. As the pin 22 rotates, the proximal flange 52 of the clip 24 limits the amount of rotation of the pin 22 by engaging with the lower flange 40 of the pin 22. As shown in FIG. 1, the proximal flange 52 of the clip 24 is spaced a distance D from the lower flange 40 of the pin 22. The distance D between the proximal flange 52 and lower flange 40 depends on the application and the amount of tolerance variation to be accommodated, and thus the distance D determines the limit of the rotation of the pin 22 relative to the clip 24. When positive contact occurs between the proximal flange 52 of the clip 24 and the lower flange 40 of the pin 22, the proximal flange 52 acts as a stop and inhibits the pin 22 from rotating further.

In FIGS. 5A and 5B, the pin 22 is illustrated rotating in different directions to accommodate part (doghouse wall 64, adjacent part 66) and assembly tolerances. Since the bulb 30 is spherical, assembly tolerances can be accommodated in the X, Y, and Z directions with 360° of freedom of rotation.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A connection assembly comprising:
   a pin comprising:
      a head portion comprising two spaced flanges defining a slot therebetween;
      a tail portion defining a bulb; and
      a shaft extending between the head portion and the tail portion;
   a clip comprising:
      a plurality of resilient fingers extending radially inward, the plurality of resilient fingers including a set of first fingers and a set of second fingers; and
      a central cavity,
   wherein the pin extends through the central cavity of the clip, and the plurality of resilient fingers receive and rotationally engage the bulb,
   wherein the first fingers engage the bulb closer to the shaft than the second fingers.

2. The connection assembly according to claim 1, wherein the clip further comprises a proximal flange spaced a distance D from the two spaced flanges of the pin when a central axis of the clip is coaxial with the shaft, wherein the distance D is configured to limit rotation of the pin relative to the clip.

3. The connection assembly according to claim 2, wherein the two spaced flanges of the pin are wider than the proximal flange of the clip.

4. The connection assembly according to claim 1, wherein the plurality of resilient fingers define tapered end faces adapted to conform to an outer surface of the bulb.

5. The connection assembly according to claim 1, wherein the plurality of resilient fingers are evenly spaced.

6. The connection assembly according to claim 1, wherein the slot of the pin is sized to receive a wall of a component to be secured to an adjacent component.

7. The connection assembly according to claim 1, wherein an outer surface of the clip is tapered inwardly in a distal direction.

8. The connection assembly according to claim 1, wherein the bulb is spherical.

9. The connection assembly according to claim 1, wherein the first and second fingers alternate about a central axis of the clip.

10. The connection assembly according to claim 1, wherein the second fingers define an aperture open to an exterior of the clip, the bulb extending through the aperture.

11. The connection assembly according to claim 1, wherein adjacent ones of the second fingers define corresponding slots open to an exterior of the clip.

12. An assembly comprising:
   a molded component including a wall;
   a part disposed adjacent to the wall of the molded component; and
   a connection assembly for connecting the molded component to the part comprising:
      a pin comprising:
         a head portion comprising two spaced flanges defining a slot therebetween, the slot adapted to receive the wall of the doghouse;
         a tail portion defining a bulb; and
         a shaft extending between the head portion and the tail portion;
      a clip comprising:
         a proximal flange spaced a distance D from the two spaced flanges of the pin when the clip is in a first rotational position relative to the pin, wherein the distance D is configured to permit rotation of the pin relative to the clip through a limited angular range, and the part abuts a surface of the proximal flange, the proximal flange being axially between the part and one of the two spaced flanges;
         a plurality of resilient fingers extending radially inward; and
         a central cavity,
      wherein the pin extends through the central cavity of the clip, and the plurality of resilient fingers receive and engage the bulb.

13. The assembly according to claim 12, wherein the plurality of resilient fingers define tapered end faces adapted to conform to an outer surface of the bulb.

14. The assembly according to claim 12, wherein an outer surface of the clip is tapered inwardly in a distal direction.

15. The assembly according to claim 12, wherein the bulb is spherical.

16. A motor vehicle having the assembly according to claim 12.

17. A connection assembly comprising:
   a pin comprising:
      a head portion comprising two spaced flanges defining a slot therebetween;
      a tail portion defining a bulb; and
      a shaft extending between the head portion and the tail portion;
   a clip comprising:
      a proximal flange spaced a distance D from the two spaced flanges of the pin when the clip is in a first rotational position relative to the pin;
      a plurality of resilient fingers extending radially inward; and
      a central cavity,
   wherein the pin extends through the central cavity of the clip, and the plurality of resilient fingers receive and engage the bulb to permit rotation of the clip from the first position to a second position relative to the pin, wherein in the second position the proximal flange contacts one of the two spaced flanges of the pin.

18. The connection assembly according to claim 17, wherein the plurality of resilient fingers define tapered end faces adapted to conform to an outer surface of the bulb.

19. The connection assembly according to claim 17, wherein the two spaced flanges of the pin are wider than the proximal flange of the clip.

20. The connection assembly according to claim 17, wherein the bulb is spherical.

* * * * *